(12) United States Patent
Van Eeden

(10) Patent No.: US 12,096,742 B2
(45) Date of Patent: Sep. 24, 2024

(54) MILK FILTER AND MILKING DEVICE PROVIDED THEREWITH

(71) Applicant: LELY PATENT N.V., Maassluis (NL)

(72) Inventor: Bart Van Eeden, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 49 days.

(21) Appl. No.: 18/023,133

(22) PCT Filed: Sep. 2, 2021

(86) PCT No.: PCT/IB2021/058019
§ 371 (c)(1),
(2) Date: Feb. 24, 2023

(87) PCT Pub. No.: WO2022/049516
PCT Pub. Date: Mar. 10, 2022

(65) Prior Publication Data
US 2023/0320311 A1   Oct. 12, 2023

(30) Foreign Application Priority Data
Sep. 3, 2020  (NL) ..................... 2026405

(51) Int. Cl.
*A01J 7/02*  (2006.01)
*A01J 9/02*  (2006.01)

(52) U.S. Cl.
CPC .................... *A01J 7/022* (2013.01); *A01J 9/02* (2013.01)

(58) Field of Classification Search
CPC ... A01J 9/02; A01J 11/06; A01J 5/0134; A01J 5/007; A01J 7/022
See application file for complete search history.

(56) References Cited

U.S. PATENT DOCUMENTS 3,139,857 A * 7/1964 Merritt ............... A01J 11/06
                                                      119/14.46
4,061,504 A * 12/1977 Zall ..................... A01J 7/022
                                                      134/107
(Continued)

FOREIGN PATENT DOCUMENTS

EP   1 221 282 A1   7/2002
NL   8102764 A *    1/1983   .............. A01J 11/06
(Continued)

OTHER PUBLICATIONS

International Search Report, issued in PCT/IB2021/058019, dated Jan. 27, 2022.
(Continued)

*Primary Examiner* — Christopher D Hutchens
(74) *Attorney, Agent, or Firm* — Birch, Stewart, Kolasch & Birch, LLP

(57) ABSTRACT

An automatically cleanable milk filter includes a cylindrical housing with a longitudinal direction and with a cylindrical outer wall, a first end with a first liquid connection, and a second end with a second liquid connection, wherein, during use of the filter, the second end is situated above the first end. A concentric cylindrical filter plate containing a plurality of filter holes with a smallest diameter of between 60 and 100 um and a cylindrical core which is placed concentrically within the filter plate are accommodated in the housing. The filter plate divides the filter volume into a first volume part which is directly connected to the first liquid connection, and a second volume part which is directly connected to the second liquid connection. The second volume part includes a cylindrical part, as well as a top part which narrows at a transition to the second liquid connection. The cylindrical part, viewed in a direction towards the second liquid connection, extends at least a predetermined distance beyond the plurality of holes in the filter plate, and the first volume (Continued)

Figure 1:
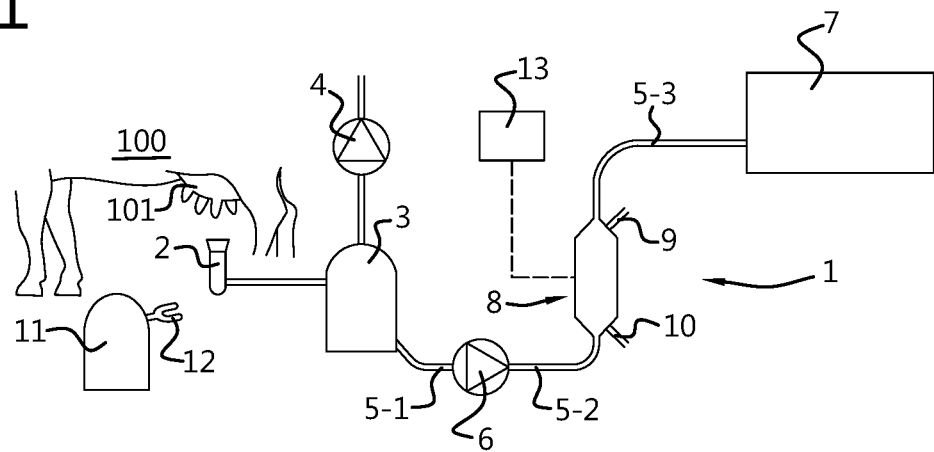

part, viewed in a direction towards the second liquid connection, does not extend beyond the filter plate. In this way, the stream of cleaning liquid, supplied from above, can develop beyond the top part to form a more turbulent stream parallel to the cylindrical part, and thus a more thorough cleaning of, in particular, the upper filter holes. In addition, a milking device including this milk filter is provided.

11 Claims, 2 Drawing Sheets

(56) References Cited

U.S. PATENT DOCUMENTS

| | | | | |
|---|---|---|---|---|
| 4,356,791 | A | * 11/1982 | Ward | A01J 9/02 |
| | | | | 119/14.33 |
| 5,896,828 | A | * 4/1999 | Kronschnabel | A01J 7/022 |
| | | | | 119/14.02 |

FOREIGN PATENT DOCUMENTS

| | | | |
|---|---|---|---|
| NL | 1037403 | C | 4/2011 |
| RU | 175 706 | U1 | 12/2017 |
| RU | 2 682 045 | C1 | 3/2019 |

OTHER PUBLICATIONS

Written Opinion of the International Searching Authority, issued in PCT/IB2021/058019, dated Jan. 27, 2022.

* cited by examiner

MILK FILTER AND MILKING DEVICE PROVIDED THEREWITH

The invention relates to an automatically cleanable milk filter for filtering milk which is obtained in a milking device for milking dairy animals, and which comprises a cylindrical housing with a longitudinal direction and with a cylindrical outer wall, a first end with a first liquid connection, and a second end with a second liquid connection.

Milking of dairy animals requires that the milking device is cleaned in its entirety, in order to prevent milk residues from being deposited and bacteria and the like from growing in the milk residues. To this end, it is known to clean milking devices, in which case as much milk as possible is removed from the milking device first. Subsequently, the milk residues, comprising inter alia milk fats and milk proteins, are removed by means of hot water containing an acid or base. Finally, rinsing with cold or lukewarm water takes place in order to remove residues of the acidic or alkaline cleaning liquid and to cool down the milking device for subsequent use with dairy animals.

It is also necessary to filter the obtained milk before it is passed to the milk tank. In this case, impurities such as manure particles and bedding particles, hairs, but also cell clusters and flakes and the like are filtered from the milk. After some time, the filter will become excessively soiled. It is therefore important to ensure that action is taken so that new milkings can be performed with a clean filter.

Until now, filter sleeves have been used which have to be replaced at least three times a day or more often if the situation required it due to reduced milk flow or the like. This is very labor-intensive and consumes a relatively large amount of base materials due to filter sleeves.

Furthermore, NL-C-1037403 discloses a milking device with a stainless steel milk filter which can be cleaned using countercurrent cleaning. As a result thereof, the filter can be made suitable for further use without having to replace it. In this way, the labor-intensive replacement of the filter sleeves and the excessive consumption of base materials is already efficiently prevented. The known milk filter seems to be cleaned in countercurrent only. However, no further details regarding the milk filter or the cleansing thereof are provided in this case.

NL-8102764 likewise discloses a steel filter, comprising a fabric of stainless steel wires which is arranged on a supporting mesh in the form of a stainless steel cylinder because of the desired dimensional stability. As a result of this complicated construction, the cleanability still leaves something to be desired.

From the prior art, cylindrical filters with holes are known which can be cleaned in countercurrent, but as far as the Applicant knows, these are not used with milking devices, and even if they could readily be used in milking devices, the cleanability of at least part of such a milk filter is not satisfactory, as she has found in tests.

It is therefore an object of the present invention to provide a milk filter of the kind indicated in the introduction which has an improved cleanability.

The invention achieves this object, at least partly, by means of a milk filter according to claim 1, in particular an automatically cleanable milk filter for filtering milk which is obtained in a milking device for milking dairy animals, and comprising a cylindrical housing with a longitudinal direction and with a cylindrical outer wall, a first end with a first liquid connection, and a second end with a second liquid connection, wherein, during use of the filter, the second end is situated above the first end, wherein a substantially concentric cylindrical filter plate containing a plurality of filter holes with a smallest diameter of between 60 and 100 µm and a cylindrical core which is placed concentrically within the filter plate are accommodated in the housing, wherein the filter plate divides the filter volume into a first volume part which is directly connected to the first liquid connection, and a second volume part which is directly connected to the second liquid connection, wherein the second volume part comprises a cylindrical part, as well as a top part which narrows at a transition to the second liquid connection, wherein said cylindrical part, viewed in a direction towards the second liquid connection, extends at least a predetermined distance beyond the plurality of holes in the filter plate, and wherein said first volume part, viewed in a direction towards the second liquid connection, does not extend beyond the filter plate, in particular up to a highest hole.

The milk filter according to the invention has an excellent cleanability if it is cleaned in countercurrent. In particular the cleanability of the upper holes is greatly improved compared to a milk filter in which the cylindrical part does not extend beyond the holes. It should be noted here that "not beyond the filter plate" means that the distance over which the first volume part extends beyond the filter plate or beyond the upper hole, respectively, is less than half, preferably less than one tenth of the distance over which the second volume part extends beyond the upper hole. Furthermore, the term "filter plate" is understood to refer only to the uncovered part of the filter plate, so that any part against which liquid laps on only one side, or not at all, is not counted, such as a part which serves for connection by a welding, bonding or another kind of connection.

Without deeming itself to be bound to an explanation, the inventor presumes that the following is the reason therefor. Of course, milk filters are provided in the milk line which runs towards the milk tank or another milk receptacle, both with automatic and non-automatic milking devices. Often, this milk line has a diameter of between 1.5 and 3 cm. In order to ensure sufficient filtering capacity, the milk filter will have to have a larger diameter, if only because either the milk supply or the milk discharge is connected to the central part of the milk filter, so that the outer part, which is situated on the other side of the milk filter, will necessarily have a larger diameter. All this can also be seen in said documents from the prior art. In order to prevent too much remaining milk from being lost during cleaning, said central part is largely filled with a core. However, this means that the cleaning liquid passes from the supplying line, in which line the cleaning liquid itself is already turbulent, into an annular duct which is much narrower than the supplying line and, in addition, has to make a bend in order to end up in the cylindrical part of the filter.

Due to this bend and narrowing, the stream of cleaning liquid will have a boundary layer at the start of the cylindrical part of the filter on the walls (of the core and/or the housing and/or the filter plate), which boundary layer, as is known, starts at a velocity zero, and is therefore laminar. Such a laminar boundary layer only has slight fluctuations in, inter alia, the velocity and the wall sheer stress, and produces inadequate cleaning. In the main flow direction, the boundary layer will develop and grow, as a result of which the central flow becomes quicker and will ultimately change the boundary layer from laminar to turbulent. Although the stream of cleaning liquid in the supplying line is completely turbulent in principle, it is not sufficiently quick to make the boundary layer already change after the bend and at the start of the cylindrical part of the filter. This is related to the limited allowed pressure and the resulting velocity of the cleaning liquid in the supplying line. The problem seems to be related to the limited velocity of the cleaning liquid, which stream has to pass from a wide line to a thin ring, and thus has to pass through bends. In such a case, the development of the boundary layer from laminar to (completely) turbulent has to take place first, because only in the latter case will the cleansing of the surface be sufficiently thorough, due to sufficiently large fluctuations in the velocity and thus in the wall sheer stress.

If this development were to take place right at the start of the holes in the filter plate, the first, upper holes would be cleaned to an insufficient degree. By contrast, according to the invention, at least a predetermined length has been provided in the duct between the cylindrical part of the core and the filter plate with holes, over which length the stream of cleaning liquid can develop (the still laminar boundary layer grows and the cleaning liquid accelerates in the center of the duct, until all this is sufficient to render the boundary layer turbulent), as a result of which the local wall sheer stress, and in particular the fluctuation thereof, will increase, and the impurities can indeed readily come off, in particular at the upper holes. It therefore appears to be better not to provide the first part of the filter plate with holes. This clashes with the idea to provide the filter plate with holes over its entire surface in order to provide as little flow resistance to the milk as possible, but this would result in a poorer cleanability of the upper holes. To be very precise, a new laminar boundary layer will appear at the transition from the upper part without holes to the actual filter part with holes, but because the liquid stream has already been able to develop in and over that upper part a boundary layer which is already turbulent there, the new laminar boundary layer will be able to change from laminar to turbulent much more quickly than in the prior art, and will then (again) have the improved cleanability.

For example, with the milk filter known from NL-8102764, the filter mesh is in particular arranged over a mounting hub 14, so that that portion of the actual filter material 20 is in particular not, at least not thoroughly, cleaned in the countercurrent cleansing.

In this case, the following should furthermore be noted with regard to the present invention: for reasons of symmetry, it is advisable to use the milk filter in an upright position, wherein the first liquid connection, through which milk enters, is provided at least centrally at the bottom. Then, when the filter is used, the milk will flow into the milk filter from below. This is better than from above, because then milk would drop into the filter at every milking pulsation, which causes an undesirable mechanical load on the milk. Due to the desired countercurrent cleaning to loosen filtered impurities from the filter, the cleaning liquid will therefore have to be supplied from above. This may be effected either centrally or straight from above in order to cause as little flow resistance as possible, but could also be effected tangentially, in which case a spiral shape may provide an additional velocity component.

Particular embodiments of the milk filter are described in the dependent claims and in the following part of the introduction of the description.

In embodiments, the second volume part has a radial thickness, wherein said distance is at least ten times said radial thickness. In this case, the radial thickness is the dimension of the second volume part viewed in the radial direction. With such a length of the second volume part above the holes, the stream of cleaning liquid does have the opportunity to develop sufficiently to form a stream with sufficient velocity fluctuations and thus sufficiently high local wall sheer stress for a good cleaning action. It should be noted that all this depends slightly on the (internal) geometry of the milk filter and of the amount of cleaning liquid and its velocity. The latter in turn depends on the pressure exerted thereon and on any added compressed air. However, due to the regulations, it is not allowed to achieve such velocities that the cleaning liquid already has a sufficient cleaning action at said bend without special and expensive additional measures.

In embodiments, the average radial thickness of the first volume part and the average radial thickness of the second volume part are virtually equal at the location of the plurality of holes. This means that the filter plate is situated approximately in the center between the core and the outer wall of the housing. With a small radial thickness of the duct, that is to say of the first volume part plus the second volume part, with respect to the radius of the duct, it is also possible to arrange the filter plate slightly further inwards, in such a way that the volume of the first volume part and the second volume part are virtually equal. In this connection, "virtually" means that the difference is at most 20%.

The invention also relates to a milking device according to claim 4, in particular a milking device for milking dairy animals, comprising milking means for obtaining milk from the dairy animals, a milk tank for storing of obtained milk, a milk line for transporting the obtained milk from the milking means to the milk tank, and an automatically cleanable milk filter provided in the milk line for filtering milk according to the above-described invention, a cleaning device for the milk filter, a control unit for controlling the milking device, wherein the cleaning device comprises a cleaning liquid supply which is controllable by the control unit and has an inlet valve, and which is connectable to the second liquid connection of the milk filter, a cleaning liquid discharge with an outlet valve which is controllable by the control unit, and which is connectable to the first liquid connection, wherein the cleaning device is configured to clean the milk filter under control of the control unit by passing cleaning liquid through the milk filter in countercurrent via the cleaning liquid supply, and to discharge the cleaning liquid via the cleaning liquid discharge. This milking device provides improved cleanability of the milk filter as a result of the countercurrent cleaning and the construction of the milk filter as described in the first-mentioned aspect of the invention. This advantage and how it is achieved has already been described for the milk filter. Therefore, only a brief description will be given here.

An important observation in this context is that the filter sleeves known per se are poorly cleanable, also with countercurrent cleaning, and therefore have to be replaced. Nevertheless, few other types of milk filter are being used with milking devices, despite the advantages of an automatically cleanable milk filter.

The milk filter is automatically cleanable by means of countercurrent cleaning. It can therefore be incorporated in the required automatic cleaning of the milking device as a whole, which can likewise be performed completely automatically, as is known per se. In this case, it is possible to implement countercurrent cleaning by performing a countercurrent cleaning of the entire milking device. However, this is not always desirable, because it requires all the cleaning liquid used to be removed from the entire milking device. In addition, it means that in all the impurities detached from the milk filter are transported through the remaining part of the milking device. But exactly because the milk filter is used to filter out impurities from the milk, this involves a relatively large amount of impurities. Therefore, according to the invention, the cleaning device comprises a cleaning liquid supply which is more or less directly connectable to the second liquid connection of the milk filter, and a cleaning liquid discharge which is connectable to the first liquid connection. Both the supply and the discharge can be closed and opened by means of an outlet valve which is controllable by the control unit, and can thus either allow the normal cleaning steps of the milking device to take place in the closed position of the valves, or the countercurrent cleaning in the open position. In this case, the normal milk supply and discharge line, that is to say the connections to the milk line, can also be closed by means of a valve, for example in each case by one three-way valve. The cleaning liquid then only has to pass through the milk filter in countercurrent and can then be directly passed on to a discharge, such as a sewer.

Mains water, optionally treated such as descaled, most times suffices as cleaning liquid for the countercurrent cleaning of the milk filter. The countercurrent cleansing may then, for example, be carried out with liquid in the entire milking device as a first cleaning step. As a result thereof, a considerable amount of impurities is already removed from the milk filter more or less mechanically. This reduces the flow resistance of the entire milking device and renders the remaining impurities more readily accessible for the other cleaning liquids. In this case, it is assumed that the usual steps for cleaning the milking device, inter alia with hot water comprising an acid or base, are sufficient to detach and remove a large part of any remaining impurities, such as milk fat and protein, in the milk filter.

Particular embodiments are described in the dependent claims and in the following part of the description.

In embodiments, the cleaning supply is configured to supply the cleaning liquid to the milk filter in pulses during a cleansing. Here, this involves, in particular, supplying the cleaning liquid to the milk filter in pulses in countercurrent. Due to the additional mechanical action, the cleansing of the milk filter is even better. Supplying the cleaning liquid in pulses can be achieved by the fact that the control unit is configured to open and close the inlet valve for the cleaning liquid supply in a pulsed manner.

In embodiments, the milking device comprises a compressed air connection which is controllable by the control unit and is configured to supply air at excess pressure to the cleaning liquid before the second supply of liquid. All this may be a constant supply of compressed air or a supply in pulses, optionally combined with a pulsed supply of cleaning liquid. Mechanical action resulting from the additional turbulence in the liquid ensures an even better cleaning action in this case as well.

Figure 2:
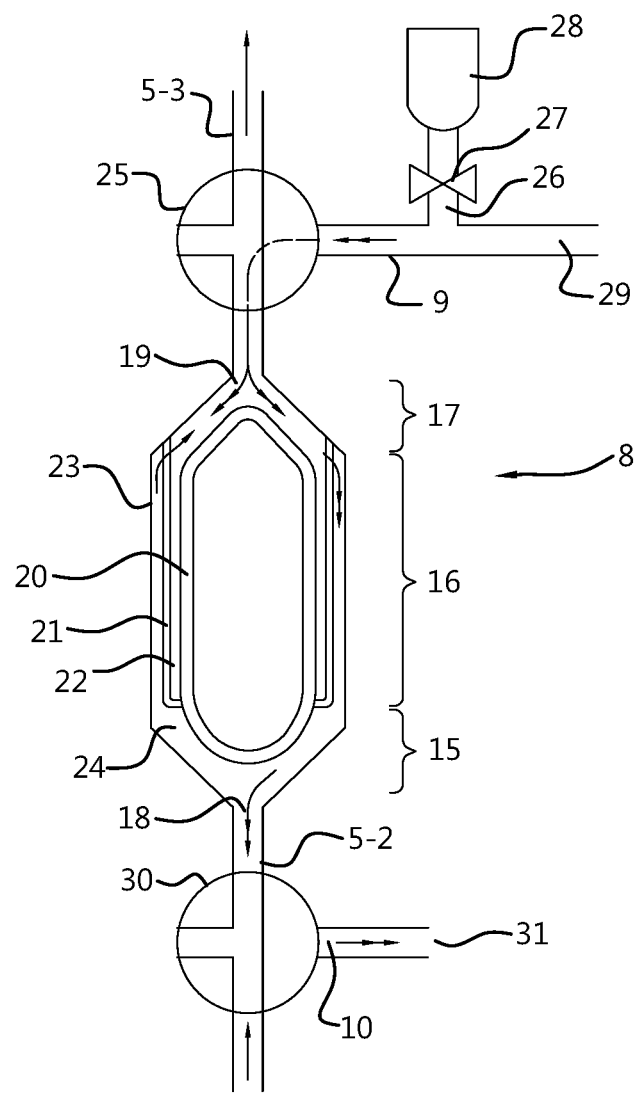
Figure 3:
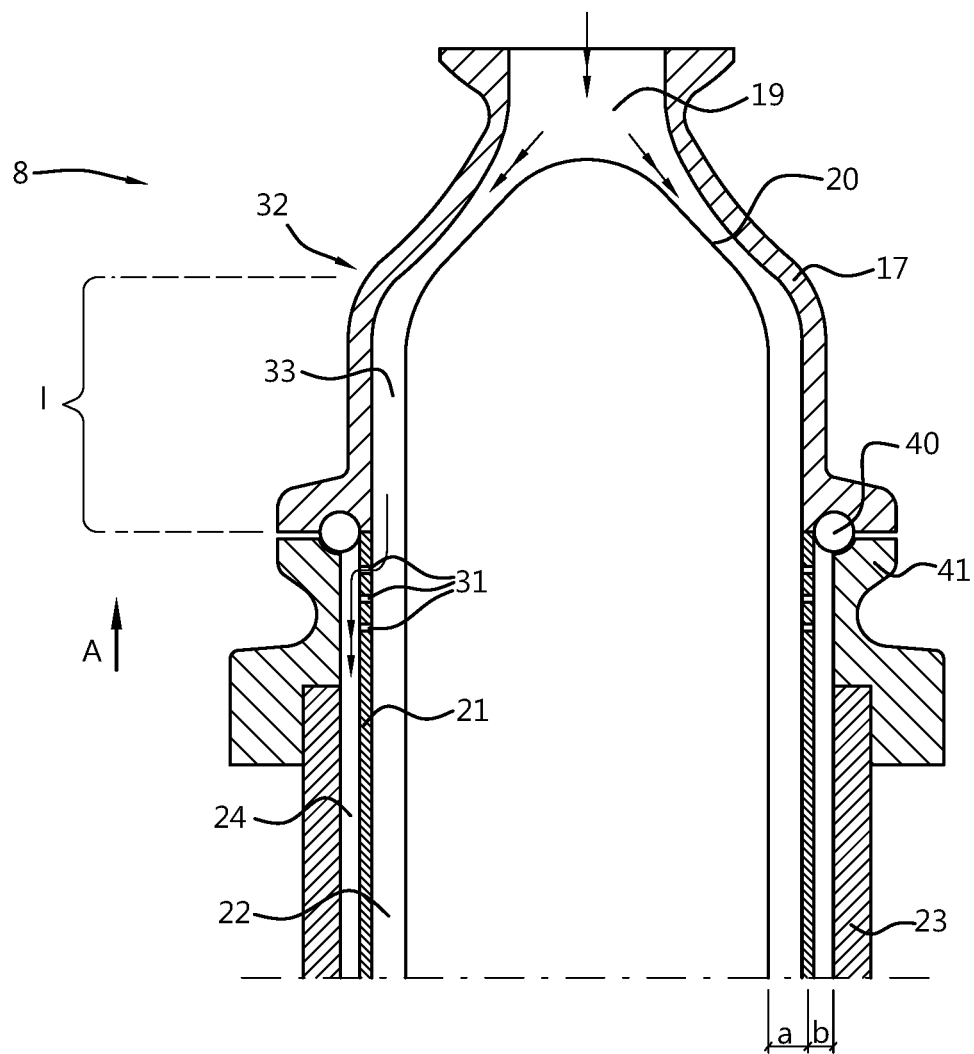

The invention will be explained below in more detail by means of some non-limiting exemplary embodiments and the drawing, as well as the description thereof, in which:

FIG. 1 shows a diagrammatic view of a milking device according to the invention, FIG. 2 shows a diagrammatic sectional view of the milk filter 8 with various connections, and FIG. 3 diagrammatically shows a detail of the milk filter 8, in particular of an upper part thereof.

FIG. 1 shows a diagrammatic view of a milking device 1 according to the invention, comprising a milking cup 2, a milking glass 3, a vacuum pump 4, a milk line 5-1, 5-2, 5-3, a milk pump 6, a milk tank 7, and a milk filter which is denoted overall by reference numeral 8, with a diagrammatic cleaning liquid connection 9 and a diagrammatic discharge connection 10. With 11 a control unit is indicated and with 12 an optional milking robot with a robot arm 13 is indicated. With 100 furthermore a dairy animal, with teats 101, is indicated.

Here, the milking device 1 is a fully automatic milking robot system, but the invention can also be applied in conventional milking systems. By means of its robot arm 13, the milking robot 12 of the milking device 1 can attach milking means, here a milking cup 2, to a teat 101 of the dairy animal under the control of the control unit 11. To this end, components which are known per se, such as a teat-detecting system, are provided, which, however, do not relate to the invention and are therefore not illustrated here and will not be explained in any more detail.

By means of the milking cup attached to the teat 101 and using, inter alia, the vacuum pump 4, the milking device is able to extract milk, which ends up in the milking glass 3. From there, the milk can be passed to the milk tank 7 by means of the milk pump 6 via the milk line, comprising parts 5-1, 5-2 and 5-3, together also denoted below by the number "5", in particular at the end of a milking operation. In the case of very large farms, the fixed milk tank 7 may also be replaced by the tank of a tanker.

The milked milk is filtered by means of the milk filter 8 provided in the milk line 5. This filter serves to filter foreign material, such as hairs, sand, bedding material and the like, from the milk. In this case, the milk flows through the milk filter from the bottom to the top in the illustrated example. Inevitably, the milk filter will gradually become more soiled and will therefore have to be cleaned regularly. According to the invention, this takes place at every main cleaning service of the entire milking device, as will be explained in more detail below. Furthermore, a pressure-drop meter or the like may also be provided (not shown here), which measures the pressure drop across the milk filter 8 and which emits a signal to the control unit 11 if the pressure drop exceeds a threshold value in order to subject the milk filter 8 to an interim cleaning service.

Cleansing may be performed, for example, by passing cleaning liquid through the filter in the same direction as the milk, that is to say from the milking cups 2 and via the milk line 5 through the milk filter 8 to the milk tank 7. The hot, acid or alkaline liquids to be used may efficiently dissolve, for example, fat residues, protein residues or calcium residues. Less advantageous is the fact that hairs, sand and the like are pressed further against the filter without being removed or dissolved. However, a counterflow cleansing may be performed in order to remedy this, in which cleaning liquid is supplied in the reverse direction, in particular from cleaning liquid supply 9, via the milk filter 8 to cleaning liquid-discharge 10, such as a sewer.

All this is explained in more detail in FIG. 2, which shows a diagrammatic sectional view of the milk filter 8 with various connections. In this case, similar components are denoted by the same reference numerals throughout the drawing.

The milk filter 8 comprises a housing 23 with a first end 15 with a milk supply opening 18, a cylindrical part 16 and a second end 17 with a milk discharge opening 19. A core 20 and a filter plate 21 comprising holes are accommodated in the filter volume in the housing 23 and divide this into a first volume part 24 and a second volume part 22.

A first three-way valve 25 is connectable to the cleaning liquid-supply 9 from a holder 29 or the like and to a compressed air line 26 which is closable by a valve 27, to a compressed air generator 28. A second three-way valve 30 is connectable to the cleaning liquid discharge 10 to a sewer 31 or the like.

Furthermore, FIG. 2 shows the path of the milk during milking with a few single arrows, and the path of the cleaning liquid during a countercurrent cleansing with double arrows.

The housing 23 may have any desired cylindrical shape, with a first end 15 and a second end 17 which both narrow towards a supply and discharge, respectively. It should be noted that this supply or discharge does not necessarily have to be provided centrally and/or in the longitudinal direction. Thus, it may also be provided tangentially, in the manner of a kind of cyclone. In this case, the housing may have, for example, an entirely or partly transparent cylindrical part 16, so that the filter plate 21 may be inspected without having to remove the filter 8. Obviously, non-transparent materials, such as metals, are also possible.

The core 20 is provided in order to make the duct for the milk and the cleaning liquids, which is formed by the first and the second volume part 24 and 22, respectively, not unnecessarily large, which would render the flow velocity of, in particular, the cleaning liquid unnecessarily and undesirably low. It should be noted that a large surface area of the filter plate 21 is indeed desirable, in order to have space for a large number of holes and therefore to impede the flow of the milk as little as possible.

In this case, the filter plate 21 is a cylindrical metal plate containing a large number of holes. Although it is not imperative for the plate to be cylindrical, it has advantages if it is, with regard to an even filter action and cleaning, due to symmetry. The holes are not illustrated individually. The diameter is advantageously between 60 and 120 μm, for example on the basis of, in particular, the dimensions of the fat globules in the milk. The holes are produced, for example, by means of a laser, so that they taper, advantageously from the milk supply side to the milk discharge side, in order to further promote loosening dirt during the countercurrent cleansing. The number of holes is preferably as large as possible and, in one embodiment, is at least a few hundred thousand, such as 1.2 million.

One possible action of the milk filter is as follows. During milking, milk flows from the milk line part 5-2, via the milk inlet opening 18, into the first end 15 of the milk filter 8 from below. In this case, the milk ends up in the first volume part 24 and then flows to the second volume part 22 via the holes of the filter plate 21, foreign material remaining behind on the filter plate 21. Thereafter, the milk is forced onwards via the second end 17 and will leave the milk filter 8 via milk discharge opening 19, in order to then be pumped to the milk tank (not shown here) via the first three-way valve 25 and the milk line part 5-3.

If a main cleaning service of the milking device is performed after a milking operation, cleaning liquid will be able to follow at least a part of the same path through the milk filter 8. However, it is advantageous to start with a countercurrent cleansing in order to already remove at least part of the filtered-out foreign material from the milk filter 8, so that this will not impede the flow of cleaning liquid any further, and to render, in particular, the filter plate 21 more easily cleanable. For this countercurrent cleansing, for example, cleaning liquid, such as water, may be supplied by switching the first three-way valve 25 in such a way that it connects the cleaning liquid supply 9 and the milk filter 8, and subsequently supplying it from a holder 29, which may also be a water pipe. If desired, an additive (or an additive mixture) may be added from the additive storage reservoir 28 and additive line 26 by switching the valve 27. An additive is for example an acid, a base or a surfactant.

The cleaning liquid to be supplied in countercurrent enters the milk filter 8 via the milk discharge opening 19 of the second end 17, and will flush the milk filter 8 through the second volume part 22, the filter plate 21, the first end 15 and the milk inlet opening 18, and carry along foreign material in the process. The cleaning liquid can then run away to the sewer or a collecting receptacle via the milk line part 5-2 and the now switched second three-way valve via the cleaning liquid discharge 10. As a result thereof, the dirty cleaning water does not have to flow through the rest of the milking device.

In this case, it should be noted that, during milking, the milk will fill the filter volume (parts 22 and 24) from below. Any parts floating on the milk will, in theory, then also end up mainly in the upper holes of the filter plate 21. Furthermore, with a standard construction of the milk filter 8, the cleaning action has been found often to be insufficient in particular for these upper holes. The solution according to the invention will be explained below on the basis of FIG. 3.

FIG. 3 diagrammatically shows a detail of the milk filter 8, in particular of an upper part thereof. In this case, arrow A indicates the upright vertical direction of use.

The milk filter 8 again comprises the second end 17 with the milk discharge opening 19, the cylindrical housing or outer wall 23, the core 20 and the filter plate 21, internally comprising the first volume part 24 and the second volume part 22. In addition, some of the holes 31 are indicated diagrammatically together with a part of the cleaning liquid stream running through them, by the double arrow, as well as a bend 32 and a straight piece 33 with length/in the second end 17, and an O-ring 40 and a securing part 41.

When cleaning liquid, optionally with added compressed air or the like, enters the milk filter 8 via the milk discharge opening 19, it will first flow into the conically widening part of the second end 17, over the (optionally rounded) top side of the core 20. It should be noted that it is desirable to widen, in order to make a larger diameter of the filter plate 21 possible, which is in turn desirable in order to obtain a sufficiently large total filter surface without the filter being inconveniently long.

Subsequently, the cleaning liquid reaches the bend 32 which is desirable in order to be able to use a cylindrical filter plate 21. After the bend, the liquid first passes through the straight piece 33 with length/before reaching the upper holes 31 of the filter plate 21. Here, the cleaning liquid starts to flow out of the filter plate and clean it.

The reason for first making the cleaning liquid pass through the straight piece 33 has already been given above. In short, it is presumed, without the Applicant considering itself to be bound to a specific explanation or illustration, that the cleaning liquid does not have a clear direction after the bend, and that the boundary layer on the walls is initially laminar and grows until the accelerated stream which has been made to run parallel to the housing wall is able to make the laminar boundary layer turbulent. The fluctuations in the velocity and the wall sheer stress near the walls are then so large that the cleaning action of the liquid is sufficient.

Although it is possible to increase the velocity of the cleaning liquid, as a result of which the latter develops a turbulent boundary layer even sooner, this not only requires more energy, but, due to the associated pressures and flow rates, also means that the milking device has to meet other, more elaborate regulations. According to the invention, an alternative solution is provided which does not require said increased velocity and does therefore not fall under these regulations by first passing the cleaning liquid through the straight part 33. In that straight piece 33, the stream will develop, the cleaning liquid in the central duct being made to run parallel to the housing wall, the boundary layer will grow and will change from laminar to turbulent (in time). Due to the fact that the boundary layer will then already have changed to being turbulent at, at least closer to, the start of the holes 31, the holes 31/the filter plate 21 will be cleaned more thoroughly. From the detached part of the filter plate 21, the geometry of the entire duct changes and a stream of cleaning liquid with a new boundary layer will pass to the other side. But because there is now no bend, the velocity distribution of the cleaning liquid is actually optimal and sufficiently quick to render the (new) boundary layer turbulent almost immediately.

It should be noted here that the straight piece 33 is formed in the second end 17. In theory, it is also possible to form it by not providing the filter plate 21 itself over a corresponding length on the top side with holes 31. However, this may possibly result in the upper part of the first volume part 24 behind this part of the filter plate without holes being cleaned less thoroughly, which is undesirable, or in the part without holes having to be pressed against another structural part of the milk filter, such as an outer wall of the housing. In effect, this part without holes then forms a part of the housing and does not have a filtering or other effect. In FIG. 3, this could be illustrated as an alternative by extending the filter plate 21 along the wand of the second end 17 in at least a bottom part of the straight piece 33. It is therefore clarified here that, according to the invention, the first volume part 24 does not substantially extend beyond the upper holes 31.

The length/of the straight piece 33 is not particularly limited, albeit that the stream of cleaning liquid has to have sufficient opportunity to develop. To this end, the length/is advantageously at least ten or even more times greater than the radial thickness a of the second volume part 22. In order to keep the flow properties of the cleaning liquid broadly the same on both sides of the filter plate 21, the radial thickness a is preferably approximately equal to the radial thickness b of the first volume part 24.

The invention claimed is:

1. An automatically cleanable milk filter for filtering milk that is obtained in a milking device for milking dairy animals, and comprising
  a cylindrical housing with a longitudinal direction and with a cylindrical outer wall;
  a first end with a first liquid connection; and
  a second end with a second liquid connection, wherein, during use of the filter, the second end is situated above the first end,
  wherein a substantially concentric cylindrical filter plate containing a plurality of filter holes with a smallest diameter of between 60 and 100 um and a cylindrical core placed concentrically within the filter plate are accommodated in the housing,
  wherein the filter plate divides the filter volume into a first volume part directly connected to the first liquid connection, and a second volume part directly connected to the second liquid connection,
  wherein the second volume part comprises a cylindrical part, as well as a top part which narrows at a transition to the second liquid connection,
  wherein said cylindrical part, viewed in a direction towards the second liquid connection, extends at least a predetermined distance beyond the plurality of holes in the filter plate, and
  wherein said first volume part, viewed in a direction towards the second liquid connection, does not extend beyond the filter plate.

2. The milk filter as claimed in claim 1, wherein the second volume part has a radial thickness, wherein said distance is at least ten times said radial thickness.

3. The milk filter as claimed in claim 2, wherein the average radial thickness of the first volume part and the average radial thickness of the second volume part are virtually equal at the location of the plurality of holes.

4. A milking device for milking dairy animals, comprising:
  milking means for obtaining milk from the dairy animals;
  a milk tank for storing of obtained milk;
  a milk line for transporting the obtained milk from the milking means to the milk tank;
  the automatically cleanable milk filter provided in the milk line for filtering milk, as claimed in claim 2;
  a cleaning device for the milk filter; and
  a control unit for controlling the milking device,
  wherein the cleaning device comprises:
  a cleaning liquid supply being controllable by the control unit and having an inlet valve, the cleaning liquid supply being connectable to the second liquid connection of the milk filter,
  a cleaning liquid discharge with an outlet valve controllable by the control unit, the cleaning liquid discharge being connectable to the first liquid connection,
  wherein the cleaning device is configured to clean the milk filter under control of the control unit by passing cleaning liquid through the milk filter in countercurrent via the cleaning liquid supply, and to discharge the cleaning liquid via the cleaning liquid discharge.

5. The milk filter as claimed in claim 1, wherein the average radial thickness of the first volume part and the average radial thickness of the second volume part are virtually equal at the location of the plurality of holes.

6. A milking device for milking dairy animals, comprising:
  milking means for obtaining milk from the dairy animals;
  a milk tank for storing of obtained milk;
  a milk line for transporting the obtained milk from the milking means to the milk tank;
  the automatically cleanable milk filter provided in the milk line for filtering milk, as claimed in claim 3;
  a cleaning device for the milk filter; and
  a control unit for controlling the milking device,
  wherein the cleaning device comprises:
  a cleaning liquid supply being controllable by the control unit and having an inlet valve, the cleaning liquid supply being connectable to the second liquid connection of the milk filter,
  a cleaning liquid discharge with an outlet valve controllable by the control unit, the cleaning liquid discharge being connectable to the first liquid connection,
  wherein the cleaning device is configured to clean the milk filter under control of the control unit by passing cleaning liquid through the milk filter in countercurrent via the cleaning liquid supply, and to discharge the cleaning liquid via the cleaning liquid discharge.

7. A milking device for milking dairy animals, comprising:
  milking means for obtaining milk from the dairy animals;
  a milk tank for storing of obtained milk;
  a milk line for transporting the obtained milk from the milking means to the milk tank;

the automatically cleanable milk filter provided in the milk line for filtering milk, as claimed in claim 1;
a cleaning device for the milk filter; and
a control unit for controlling the milking device;
wherein the cleaning device comprises;
- a cleaning liquid supply being controllable by the control unit and having an inlet valve, the cleaning liquid supply being connectable to the second liquid connection of the milk filter; and
- a cleaning liquid discharge with an outlet valve being controllable by the control unit, the cleaning liquid discharge being connectable to the first liquid connection, wherein the cleaning device is configured to clean the milk filter under control of the control unit by passing cleaning liquid through the milk filter in countercurrent via the cleaning liquid supply, and to discharge the cleaning liquid via the cleaning liquid discharge.

8. The milking device as claimed in claim 7, wherein the cleaning supply is configured to supply the cleaning liquid to the milk filter in pulses during a cleansing.

9. The milking device as claimed in claim 8, comprising a compressed air connection controllable by the control unit and being configured to supply air at excess pressure to the cleaning liquid before the second supply of liquid.

10. The milking device as claimed in claim 7, comprising a compressed air connection which is controllable by the control unit and being configured to supply air at excess pressure to the cleaning liquid before the second supply of liquid.

11. The milking filter as claimed in claim 1, wherein said first volume part, viewed in a direction towards the second liquid connection, does not extend up to a highest hole in the filter plate.

* * * * *